March 29, 1927.
F. G. KEYES
REFRIGERATING MACHINE
Filed May 11, 1920
1,622,520
2 Sheets-Sheet 2
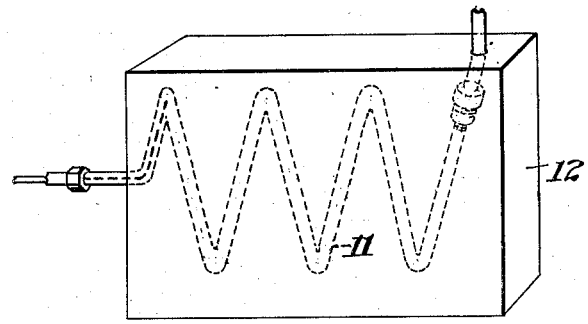
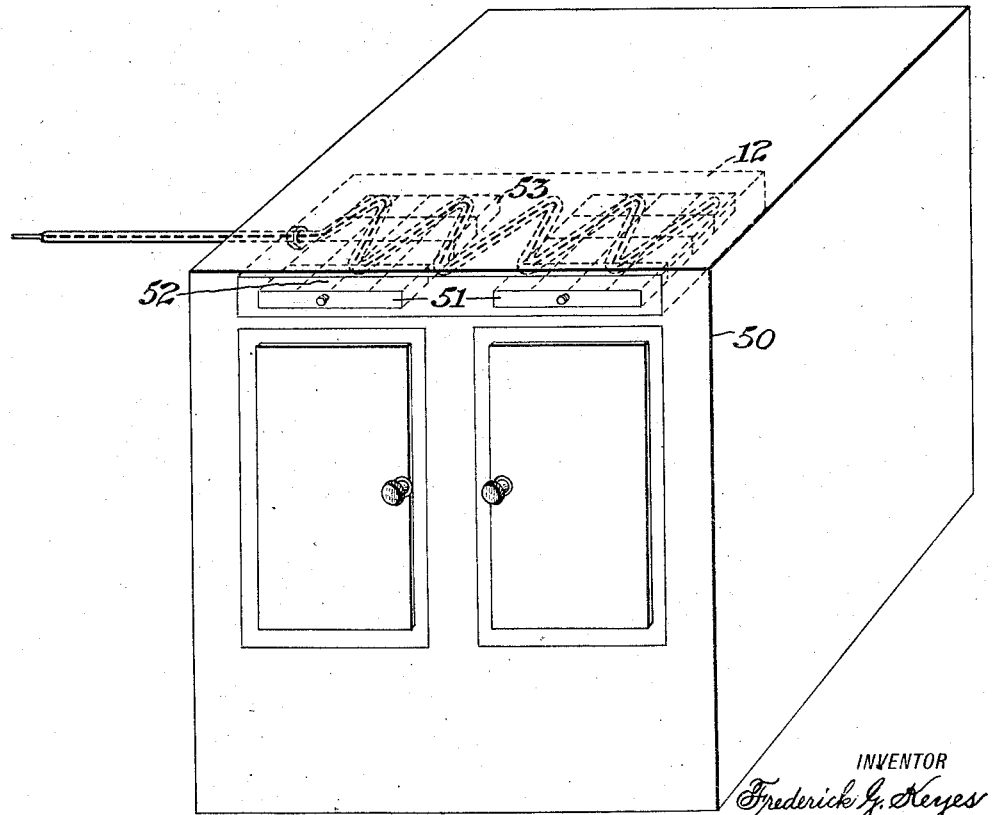
INVENTOR
Frederick G. Keyes
BY
Kerr, Page, Cooper & Hayward
HIS ATTORNEYS Patented Mar. 29, 1927.

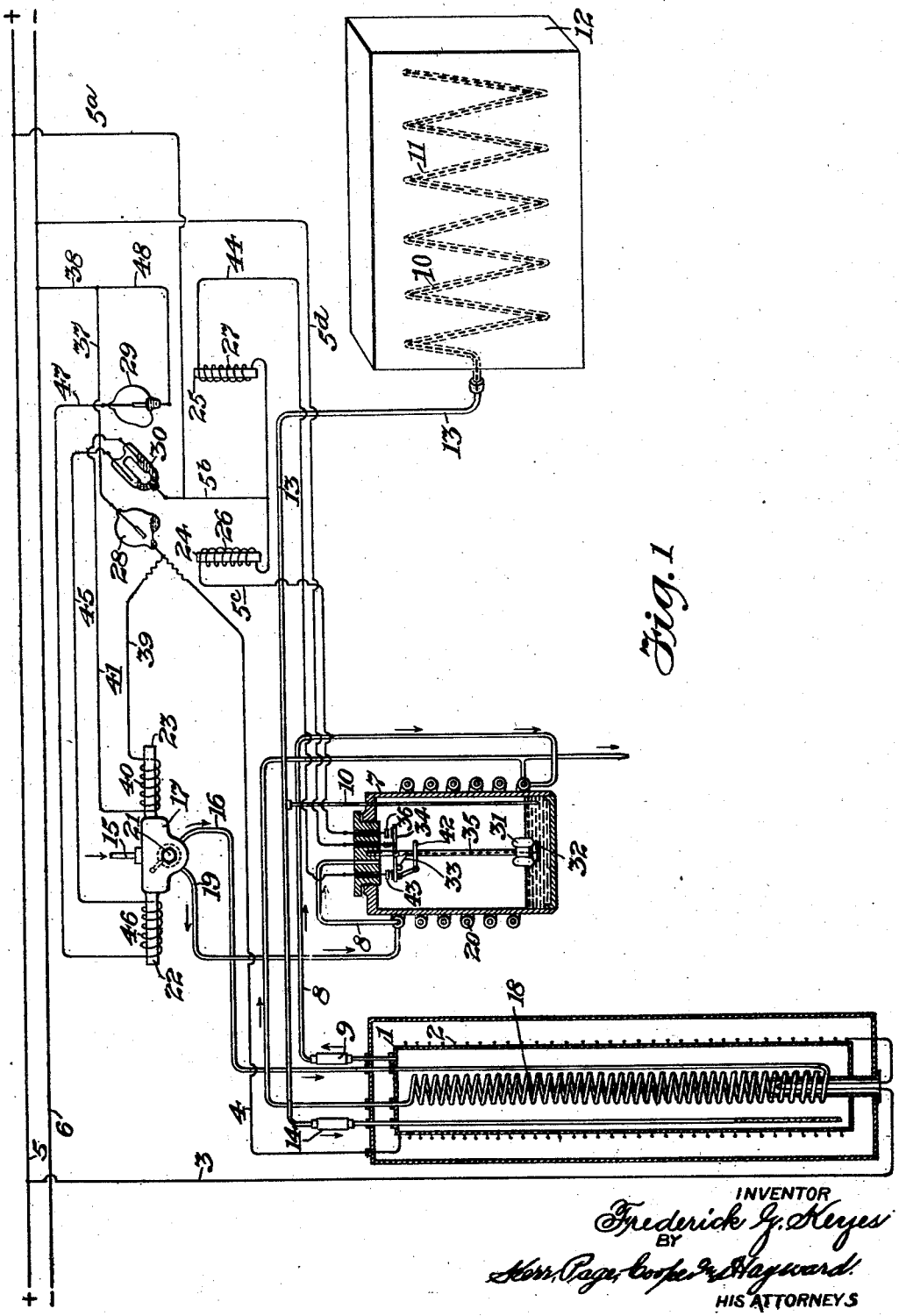

1,622,520

UNITED STATES PATENT OFFICE.

FREDERICK G. KEYES, OF CAMBRIDGE, MASSACHUSETTS, ASSIGNOR, BY MESNE ASSIGNMENTS, TO NATIONAL REFRIGERATING COMPANY, OF BOSTON, MASSACHUSETTS, A CORPORATION OF MASSACHUSETTS.

REFRIGERATING MACHINE.

Application filed May 11, 1920. Serial No. 380,540.

My present invention relates to a novel form of refrigerating apparatus of the automatic type, wherein is an absorbent material, such as ammonium nitrate, or an adsorbent material, such as activated charcoal, for taking up and storing the refrigerating vapor, such as ammonia, during the evaporation period and has for its object to provide in such a system a novel system of control of said apparatus associated with the storage or intermediate tank thereof, and a novel form of refrigerating chamber.

I have illustrated my invention in the accompanying drawing in which Figure 1 is a diagrammatic representation of my apparatus; Figure 2 shows an alternative arrangement of the expansion coil and Figure 3 is a front elevation of the storage receptacle showing the refrigerating member of my apparatus applied thereto.

Referring to the drawings, a distillation chamber or still, 1, containing the refrigerant, ammonia, for instance, and a material having an affinity therefor, preferably an activated adsorbent, such as charcoal, is surrounded by an electric heating coil, 2, connected by wires, 3 and 4, with suitable control mechanism, presently to be described, to a suitable source of current, 5, 6. A condensing chamber, 7, is connected to the still, 1, by a pipe, 8, a one way valve, 9, permitting the passage of the refrigerant material only in the direction of the condenser, 7, being located in said pipe, a capillary, 10, connects the chamber, 7, with a refrigerating chamber, 11, consisting of a tube coiled or saw tooth shaped, or otherwise disposed and mounted in a brine tank, 12. The refrigerating member, 11, is connected by a pipe, 13, to the still, 1, and contains a one way valve, 14, permitting flow of the refrigerant only toward the still, 1. The capillary, 10, enters the tube, 13, in the neighborhood of the still, 7, and is sealed therein and passes through substantially the entire length of the refrigerating member, 11, into the neighborhood of the blind end thereof.

A cooling device comprising a water supply, 15, and an outlet pipe, 16, is connected through a two way valve box, 17, to a cooling coil, 18, in the still, 1, and through a pipe, 19, leading to a cooling coil, 20, surrounding the condenser, 7. In the box, 17, there is a two way valve, 21, for alternately supplying water to the pipes 16 and 19 during the operation of the apparatus, the valve 21 being connected to a bar of magnetic material which oscillates in the lateral extensions 22 and 23 of the valve box 17.

An electrical control system for the apparatus is provided and as fully set forth in my prior application Serial Number 359,882, filed February 19th, 1920, comprises a rocking beam (not shown) connected to armatures 24 and 25 of coils 26 and 27. A number of switches, 28, 29 and 30, are mounted on said rocking beam and by the movement thereof are shifted from one position to another, so that the said switches make and break alternately, the switch 30 being a time switch for cutting out the valve shifting current after it has done its work.

At the beginning of the distilling cycle in the operation of the device, the liquid in the chamber, 7, has fallen to the point where the float, 31, rests on a button, 32, and depresses the same. This downward movement of the button causes the wire, 33, to pull the bar, 34, to which it is connected, downward. The bar, 34, is pivoted on the rod, 35, and insulated therefrom by glass or jewel pivot bearings. The downward pull of the wire, 33, causes the rod, 34, to make connection with the contact, 36, whereupon current flows from the main, 5, through the wire $5^a$, $5^b$, the coil 26, the wire $5^c$, the wire $5^d$, to the main 6, causing the coil 26 to attract the armature 24 and thus shift the switches 28, 29 and 30 to the position where the switch 28 is closed, the switch 29 is open and the mercury in the time switch 30 is beginning to move to break contact on one side thereof. The closing of the switch, 28, causes current to flow from the main, 5, through the wire, 3, the heater coil, 2, the wire 4, the switch 28, the wire 37, the wire 38 to the main 6. At the same time, current flows through a shunt circuit comprising the wire 39, the coil 40, the wire 41, down the right hand side of the switch 30 to the wire $5^a$ to the main 5, actuating the coil 40 which draws the armature on which the water valve is mounted shifting the valve to permit water to flow through the pipe 19 to the cooling coil 20 on the condenser 7. The mercury in the switch 30 has been moving slowly through the capillary and when a sufficient time has elapsed, say five seconds, to insure that the water valve has been moved over to send the water through the pipe, 19, the circuit through the right hand side of the switch 30 will be opened, thus breaking the shunt circuit through the coil 40. In the meantime, with current flowing through the heater coil, 2, ammonia vapor will be distilled over through the pipe 8 to the condensing chamber 7 and will collect therein. In a short time sufficient liquid will have collected to raise the float off the button 32, whereupon the arm 34 will drop out of connection with the contact 36, thus breaking the circuit through the switch shifting coil 26. As the distilling operation proceeds, the level of the liquid in the chamber 7 is raised until the float 31 comes in contact with an arm 42, raising the arm 34 into connection with contact 43 whereupon current flows from the main 5 through the wire 5a, 5b, the coil 27, and the wire 44, the contact 43, the bar 34, the wire 5d to the main 6, causing the coil 27 to attract its armature 25 and shift the switch 29 into the closed position and break the heater circuit through the switch 28, thus cutting off the heater coil on the still, 1. At the same time, current flows from the main 5, the wire 5a, the left hand side of the switch 30, the wire 45, the coil 46, the wire 47, the switch 29, the wire 48, the wire 38 to the main 6, the coil 46 drawing the armature on which the valve 21 is mounted to the position where water is permitted to flow through the pipe 16 to the cooling coil 18 in the still 1. The mercury on the left hand side of the switch 30, when say five seconds have elapsed, will have moved over to the right hand side of the said switch and broken the circuit through the left hand side thereof, cutting out the current through the coil 46. The liquid in the chamber, 7, passes through the capillary, 10, in the pipe, 13, and through the refrigerating chamber or expansion tube and through substantially its entire length to a point near the blind end remote from the point of entrance of the capillary tube into the expansion or refrigerating tube. When sufficient liquid has passed into the expansion chamber through the capillary, 10, the float will be lowered and the bar 34 will drop down breaking the connection through the switch shifting magnet thus cutting off current flow through the apparatus during the refrigerating period.

The liquid ammonia will expand in the expansion tube causing refrigeration at that point and will pass back through the pipe, 13, and the valve, 14, into the chamber, 1, where it will be taken up and stored in solid form by the adsorbent material therein. At the conclusion of the refrigerating cycle, the float, 31, will have come in contact with the button 32 and the operations first described will be repeated automatically.

The capillary tube, 10, in the refrigerating period of the operation functions to deliver the liquid ammonia.

The capillary tube, 10, functions to deliver the liquid ammonia at a rate proportional to the difference in pressure between the condensing chamber, 7, containing the main supply of ammonia and the pressure in the refrigerating coil or chamber, 11. Now since the temperature of the storage tank is determined by the temperature of the cooling water and since moreover the pressure is a function of the temperature only, the amount of liquid ammonia delivered to the expansion coil or chamber, 11, will be augmented in warm weather and diminished in cold weather as the function of the temperature of the cooling water, other conditions being equal. It is obvious, therefore, that it is merely necessary to adjust the diameter and length of the capillary expansion device in any given apparatus to such proportions as will deliver the liquid refrigerant to the expansion coil or chamber according to the coolest seasonable condensing water whereupon the capillary in the warmer weather delivers increased amounts of liquid ammonia to compensate for the increased refrigerating need arising from the warmer weather.

In ordinary forms of expansion valves the liquid begins to expand outside the refrigerating chamber and continues through the coil being pumped out at the other end. It will thus be seen that there is a loss of energy or refrigerating effect due to the finite length of tube which must connect the expansion valve with the expansion coil or chamber immersed in brine. On the other hand, it will be seen that in the present apparatus, the capillary tube, 10, functions as an automatically regulating expansion valve free from mechanism. The advantages of not having to set any expansion valve at any time or season will be apparent, since in the present apparatus the capillary automatically functions to deliver liquid ammonia according to the varying temperature of the cooling water.

Apparatus of the type hereinbefore described, permit of the ready installation of the apparatus in a dwelling for instance in that the distilling chamber and the condensing chamber and the electrical system controlling the same is installed at a convenient place for such apparatus, such as the basement, and the brine tank and refrigerating coil may be located in the ice-box or storage chest located on another floor of the house, the capillary from the condensing chamber 7 to the expansion coil 11 and the return tube 13 from the expansion coil 11 to the still, 1, being run down as one pipe from the storage chest to the operating unit in the basement of the dwelling.

In Figure 2, it will be noted that the capillary tube enters the chamber 11 at one end and feeds the liquid ammonia there, the liquid ammonia expanding and passing through the return pipe leading to the still, 1, from the other end of said coil. This arrangement has been found useful in some instances, but the form shown and described in connection with Figure 1 is the preferred embodiment.

In Figure 3, the brine tank 12 is shown applied to a storage chest, 50, a pair of drawers 51, 51, having squared partitions, 52, holding water for freezing into ice cakes. The drawers 51, lying in reentrant portions, 53, of the brine tank 12.

When a material such as that referred to above and especially prepared and activated, as for example charcoal prepared from wood chips impregnated with metallic salts previous to carbonization of said chips, is utilized in a refrigerating apparatus of the type referred to, a new method of refrigeration is provided having marked advantages over previous known methods, in that the materials which have a structure similar to the prepared charcoal mentioned take up the refrigerant by adsorption, whereas the ammonium nitrate, for example, of previous methods functions as an absorbent.

By way of explanation, it may be stated that it is a well known fact that solid surfaces are capable of condensing gases thereon and holding them tenaciously. Such substances are, for example, charcoal, dried silica gel, dried colloidal ferric hydroxide, meerschaum, powdered glass and the gases are hydrogen, nitrogen, oxygen, carbon dioxide, methyl and ethyl chlorides, nitric oxide, and indeed, undoubtedly, all gases. The amount of the gases adsorbed on the same substance (charcoal for example) appears to increase in proportion approximately to the critical temperature of the substance. It is, however, at once evident that the structure and physical condition of an adsorbing material will be factors as regards the capacity and behavior of an adsorbent or at least be a consequence of the realization of a certain optimum physical state in the adsorbing substance; for example, freedom of the surface from contaminating layers of non-volatile substances, such as heavy hydrocarbons, which will prevent the attractive property of the surface from attaining its greatest magnitude. The extent of the surface is further a condition which must be considered; for the amount of vapor condensed, other things being equal, would vary approximately as the amount of adsorbing surface, or as the porosity of the material which can be presented to the vapor or gas. While it appears to be true that all solid substances are capable of condensing or adsorbing gases upon their surfaces, it will be equally evident that the amount of gas or vapor adsorbed will primarily depend upon the specific character of the adsorbent in question. For example, a surface composed of carbon atoms might possibly possess a greater force of attraction for a particular gas or vapor than would an adsorbent layer composed of atoms of silicon. There appears to be no a priori guide at the present time for deciding upon the best substance, and experience teaches that among ordinary substances especially prepared charcoal is capable of adsorbing the largest quantities of gases or vapors. It is evident, on account of the inadequate knowledge concerning the number and relation of the variables pertaining to adsorbents that it is difficult to decide whether the greater adsorbent capacity of charcoal is due to the specific nature of the carbon atoms or the extent of the surface (porosity) presented to the adsorbing gas or vapor or to other causes. Here experience must be the guide, and it has in fact been found that when methods are used in preparing the charcoal calculated to preserve the cellular structure (and therefore greater surface) that an increased capacity results. It has also been found by me in my work on charcoals, that in general, the speed of adsorbing or the rate at which the gas or vapor is condensed on the adsorbent, for example charcoal, is increased in proportion as gases or vapors already present are rinsed from the surface of the adsorbent. It appears to be a fact moreover that the ultimate capacity with respect to any particular gas or vapor is dependent on the absence of other gas or vapor molecules. As an example, it can be stated that in a particular sample of charcoal saturated with air and presented to ammonia, the rate of adsorption was small at the beginning; rose to a maximum; and diminished as saturation was approached. By pumping off the ammonia, heating, and readmitting ammonia, the rate will increase until after successive rinsings, the rate becomes a maximum at the start and drops off progressively until saturation was reached.

The rate of adsorption in the work referred to increased as a consequence of the rinsing many fold, thus demonstrating the importance of freeing the gas surface from foreign molecules. Evidently, aside from air or moisture, it is heavy molecules of hydrocarbon vapors resulting from the decomposition of the wood in the preparation of charcoal which must also be cleaned off from the surface and out of the pores of the charcoal. It has been found, in practice, that this may be effected by gentle oxidation, and is referred to technically as "activation";

although several theories have been advanced which do not emphasize the surface cleaning as the only conception of the activation effect. As a means of preserving the cellular structure in the charcoal, a treatment of the wood chips was carried out by means of metallic salts, such as zinc chloride, chromic acid, among others. While zinc chloride and chromic acid have been found to be effective for that purpose, it is possible that there are other salts which will be more effective in certain cases or with certain varieties of cellular material. It appears to be advantageous also to partially carbonize chemically, as for example, with sulphuric acid, finally completing the process by heat in the ordinary manner.

It thus results, from the use in the still of an adsorbent material of the character referred to above in conjunction with an expansion chamber of the general type shown in Figure 1 that an increased efficiency in operation is obtained due to the fact that the maximum refrigerating effect is obtained in the expansion device whether used with apparatus of the adsorbent or absorbent type and, further, due to the use of the adsorbent material in conjunction with said chamber, the speed of the refrigerating effect is increased far beyond that obtainable with previously known devices.

The details of construction of the electrical insulating leading-in devices for the chamber 7 and of the pipe joints and couplings of the present apparatus, as well as the electrical control system, are fully shown and described in my application Serial No. 359.882, filed February 19th, 1920.

What I claim is:

1. In a refrigerating apparatus, the combination with distilling and refrigerating chambers, of an intermediate condenser and condensing chamber, and electric means actuated by a variation of the level of liquid refrigerant in said condenser for controlling the cyclic operation of said apparatus.

2. In a refrigerating apparatus, the combination with distilling and refrigerating chambers, of an intermediate condenser comprising a condensing chamber, means for cyclically operating said apparatus and electric contact means in said condensing chamber for controlling the operation of the apparatus.

3. In a refrigerating apparatus, the combination with a distilling chamber containing a storing material, a refrigerating chamber connected thereto, of an intermediate condenser and condensing chamber and electric means actuated by a variation of the level of liquid refrigerant in said condenser for controlling the cyclic operation of said apparatus, and means for controlling the rate of liquid flow from the condensing chamber to the refrigerating chamber.

4. In a refrigerating apparatus, the combination with distilling and refrigerating chambers, of an intermediate condenser and condensing chamber, electric means actuated by a variation of the level of liquid refrigerant in said condenser for controlling the cyclic operation of said apparatus, and means comprising a flow restricting tube connecting the condensing chamber and the refrigerating chamber for controlling the flow of fluid between said chambers.

5. In a refrigerating apparatus, the combination with distilling and refrigerating chambers, of an intermediate condenser and condensing chamber, electric means actuated by a variation of the level of liquid refrigerant in said condenser for controlling the cyclic operation of said apparatus, and automatic means comprising a flow restricting tube connecting the condensing chamber and the refrigerating chamber for controlling the flow of fluid between said chambers, said refrigerating chamber being a long serpentine tube having a blind end and said flow restricting tube terminating near said end.

6. In a refrigerating apparatus, the combination with a distilling and refrigerating chambers, of an intermediate condenser and condensing chamber, electric means actuated by a variation of the level of liquid refrigerant in said condenser for controlling the cyclic operation of said apparatus, and means comprising a flow restricting tube free from control mechanism connecting the condensing chamber and the refrigerating chamber for controlling the flow of fluid between said chambers.

7. In a refrigerating apparatus, the combination with a still having a storing material therein, and a condenser and condensing chamber therefor, electric means actuated by a variation of the level of liquid refrigerant in said condenser for controlling the cyclic operation of said apparatus, of a refrigerating member connected therewith, said refrigerating member comprising a chamber of great length and compacted form and means for controlling the flow of liquid from the condensing to the refrigerating chambers.

8. In a refrigerating apparatus, a still, a condenser and condensing chamber connected thereto, electric means actuated by a variation of the level of liquid refrigerant in said condenser for controlling the cyclic operation of said apparatus, and a refrigerating chamber connected across said still and said condensing chamber, said refrigerating chamber comprising a tube of great length, whereby maximum refrigerating effect is obtained, and means for controlling the flow of liquid between the condensing and refrigerating chambers.

9. In a refrigerating apparatus, the combination with distilling and refrigerating chambers, of an intermediate condenser including a condensing chamber, means for operating said apparatus to alternately heat and cool the distilling chamber and to apply a cooling medium to the condenser in alternation with the cooling of the distilling chamber, and electric contact means in said condenser actuated by a variation of the level of the liquid refrigerant therein for controlling the operation of the apparatus.

In testimony whereof I hereto affix my signature.

FREDERICK G. KEYES.